United States Patent [19]

Jalink, Jr. et al.

[11] Patent Number: 6,071,087

[45] Date of Patent: Jun. 6, 2000

[54] FERROELECTRIC PUMP

[75] Inventors: Antony Jalink, Jr., Newport News; Richard F. Hellbaum, Hampton; Wayne W. Rohrbach, Yorktown, all of Va.

[73] Assignee: The United States of America as represented by the Administrator of the National Aeronautics and Space Administration, Washington, D.C.

[21] Appl. No.: 08/832,246

[22] Filed: Apr. 3, 1997

Related U.S. Application Data

[60] Provisional application No. 60/015,969, Apr. 3, 1996.

[51] Int. Cl.[7] ..................................................... F04B 17/00
[52] U.S. Cl. ........................................ 417/322; 417/413.1
[58] Field of Search .................................. 417/322, 412, 417/413.1, 413.2; 251/129.06

[56] References Cited

U.S. PATENT DOCUMENTS

| 3,657,930 | 4/1972 | Jacobson | 417/322 |
|---|---|---|---|
| 4,842,493 | 6/1989 | Nilsson | 417/322 |
| 4,869,656 | 9/1989 | Della Sala | 417/412 |
| 4,939,405 | 7/1990 | Okuyama et al. | 417/413.2 |
| 5,471,721 | 12/1995 | Haertling et al. | 29/25.35 |
| 5,632,841 | 5/1997 | Hellbaum et al. | 156/245 |
| 5,876,187 | 3/1999 | Forster et al. | 417/322 |

*Primary Examiner*—Charles G. Freay
*Attorney, Agent, or Firm*—Robin W. Edwards

[57] ABSTRACT

A ferroelectric pump has one or more variable volume pumping chambers internal to a housing. Each chamber has at least one wall comprising a dome shaped internally prestressed ferroelectric actuator having a curvature and a dome height that varies with an electric voltage applied between an inside and outside surface of the actuator. A pumped medium flows into and out of each pumping chamber in response to displacement of the ferroelectric actuator. The ferroelectric actuator is mounted within each wall and isolates each ferroelectric actuator from the pumped medium, supplies a path for voltage to be applied to each ferroelectric actuator, and provides for positive containment of each ferroelectric actuator while allowing displacement of the entirety of each ferroelectric actuator in response to the applied voltage.

14 Claims, 6 Drawing Sheets

FERROELECTRIC PUMP

CLAIM OF BENEFIT OF PROVISIONAL APPLICATION

Pursuant to 35 U.S.C. §119, the benefit of priority from provisional application 60/1015,969, with a filing date of Apr. 3, 1996, is claimed for this non-provisional application.

ORIGIN OF THE INVENTION

The invention described herein was made by employees of the United States Government and may be manufactured and used by the government for governmental purposes without the payment of any royalties thereon or therefor.

CROSS REFERENCE TO RELATED CASES

This application is related to co-pending, commonly owned U.S. Pat. No. 5,867,991, entitled "Ferroelectric Stirling-Cycle Refrigerator" and U.S. Pat. No. 5,961,096 entitled "Ferroelectric Fluid Flow Control Valve."

FIELD OF THE INVENTION

This invention relates to pumps for both liquids and gases, and more particularly to ferroelectric pumps utilizing one or more dome shaped internally prestressed ferroelectric actuators having a curvature and a dome height that varies with an electric voltage applied between an inside and outside surface of the actuators.

DESCRIPTION OF THE RELATED ART

Conventional pumps generally fall into two classes; positive displacement and force. Force pumps force a material along through a mechanical moving part, thereby creating a pressure on the material. Positive displacement pumps work on the principal of compression of the material. Examples include a reciprocating pump and a bellows pump. Reciprocating pumps normally use a piston in a cylinder and an external power source is used to provide the needed mechanical motion of the piston. A bellows pump normally consists of a pumping volume that is formed by two non-deforming externally driven end plates with a deformable membrane between the end plates.

The heat loss associated with copper windings and magnetic losses from eddy currents contribute to the reduction in the efficiency of conventional pumps using moving mechanical parts. It would be advantageous to have a pump which can meet the flow rate and pressure capabilities of conventional pumps but which suffers less heat loss. A reduction in size and construction complexity is also desired so that the cost of manufacturing can be reduced. In addition, a reduction in the number of moving mechanical parts would reduce wear and contamination and increase reliability.

Numerous pumps currently exist which utilize piezoelectric devices rather than the conventional pistons, bellows, etc. The opposing action of two piezoelectric materials is disclosed in U.S. Pat. Nos. 3,963,380 and 4,842,493. U.S. Pat. No. 3,963,380 to Thomas et al. discloses a micro pump having a variable volume chamber consisting of one or two commercially available disk benders fixed to a mounting ring. The disk benders consist of a thin wafer of piezoelectric material bonded with an epoxy cement to a slightly larger disk of brass shim stock. When a voltage is applied, the piezoelectric wafer expands or shrinks in diameter within the plane of the wafer. Because the circumference of the wafer cannot change diameter due to the bonding to the brass disk, the resulting motion is that of bulging in the center to form a spherical surface. U.S. Pat. No. 4,842,493 to Nilsson discloses a piezoelectric pump wherein piezoceramic parts are arranged in a manner such that the changes in length, width, and height all combine in concert to produce the desired pump volume displacement. Since conventional, small displacement piezoelectric elements are used, a relatively long pumping channel is needed to provide an adequate pumping volume which requires a complex assembly of component parts.

It is believed that the concept disclosed in U.S. Pat. No. 4,939,405 to Okuyama et al. is useful only for pumping against a small fluid pressure head, i.e., for pumping against very small back-pressure of the fluid to be pumped. The concept rests on increasing the piezoelectric wafer's modest amplitude by suspending it on a springy membrane and driving the wafer at the resonant frequency. The drawback is the small force and hence small fluid-head capability associated with such a resonant system. The concept also requires an intricate assembly of component parts.

U.S. Pat. Nos. 4,944,659 and 5,094,594 each use piezoelectric disks as a deforming means coupled to a deformable chamber wall of the pump. U.S. Pat. No. 4,944,659 to Abbe et al. is believed to pertain to an implantable pump with remotely commandable control logic which delivers relatively small quantities of fluid against a small fluid pressure head. Pumping action is provided by a piezoelectric disk affixed to a membrane to curve the piezoelectric disk. U.S. Pat. No. 5,094,594 to Brennan is believed to pertain to a pump for use in combination with an electrophoresis unit to supply accurate highly repeatable picoliter quantities of fluid. The variable volume chamber contains a thin wafer of piezoelectric material affixed to a larger disk of shim stock. The circumference of the wafer cannot change diameter because it is fixed to the disk; therefore, when a voltage is applied the resulting motion is that of bulging in the center.

The drawbacks of the existing piezoelectric pumps are their small flow rate and pressure capabilities. In addition, they usually require an assembly of bonded component parts. Therefore, a need exists for a new piezoelectric pump design which produces higher flow rates and higher pressures than existing piezoelectric pump devices while maintaining reliability, efficiency, small size, and low cost. There is also a need for piezoelectric pumps which do not require an assembly of bonded components. Many markets could benefit from such pumps. They may have applications in the military and biomedical areas as well as in ink jet printers and in titration processes. They may also be useful as fuel pumps and small feed pumps.

STATEMENT OF THE INVENTION

Accordingly, one object of the invention is to provide a pump which is smaller in size than existing piezoelectric pumps and which can maintain equal or greater flow rate and pressure capabilities than existing piezoelectric pumps of the same size.

Another object is to provide a pump without moving mechanical parts.

Another object of the invention is to provide a pump which does not require a complex assembly of bonded components.

A further object of the invention is to provide a pump utilizing one or more dome shaped internally prestressed ferroelectric actuators, each actuator having a curvature and a dome height that varies with an electric voltage applied between an inside and outside surface of the actuators.

Another object is to provide a pump utilizing one or more dome shaped internally prestressed ferroelectric actuators, each actuator having a curvature and a dome height that varies with an electric voltage applied between an inside and outside surface of the actuator, where each actuator has a mounting configuration which isolates the ferroelectric actuator from the pumped medium, supplies a path for voltage to be applied to the ferroelectric actuator, and positively contains the ferroelectric actuator while allowing displacement of the entire ferroelectric actuator in response to the applied voltage.

Another object of the invention is to provide unidirectional continuous pumping of both liquids and gases.

Yet another object is to provide a pump which is capable of cyclical compression of gases.

Additional objects and advantages of the present invention are apparent from the drawings and specification which follow.

SUMMARY OF THE INVENTION

According to the present invention, the foregoing and other objects and advantages are attained by providing a ferroelectric pump which utilizes one or more dome shaped internally prestressed ferroelectric actuators, each actuator having a curvature and a dome height that varies with electric voltages applied between an inside and outside surface of the actuator. The present pump embodies the recognition that ferroelectric devices, which in the past, were regarded as being only transducers of electrical power into mechanical motion, can additionally be an integral and in fact principal part of the fluid pumping mechanism. The present invention differs from reciprocating pumps in that the ferroelectric actuator itself performs both the functions of piston and cylinder. In addition, the motive mechanical force to the 'piston', rather than supplied externally, is integrally generated inside the ferroelectric device. The present pump also differs from bellows type pumps in that the end plates as well as the deforming membrane and the mechanical mover all reside in a single simple part, i.e., the ferroelectric actuator.

The present pump has one or more variable volume pumping chambers internal to a housing. Each chamber has at least one wall comprising a dome shaped internally prestressed ferroelectric actuator having a curvature and a dome height that varies with an electric voltage applied between an inside and outside surface of the actuator. A pumped medium flows into and out of each pumping chamber in response to displacement of the ferroelectric actuator. The ferroelectric actuator is mounted within each wall and isolates each ferroelectric actuator from the pumped medium, supplies a path for voltage to be applied to each ferroelectric actuator, and provides for positive containment of each ferroelectric actuator while allowing displacement of the entirety of each ferroelectric actuator in response to the applied voltage.

BRIEF DESCRIPTION OF THE DRAWINGS

A more complete appreciation of the invention and the many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
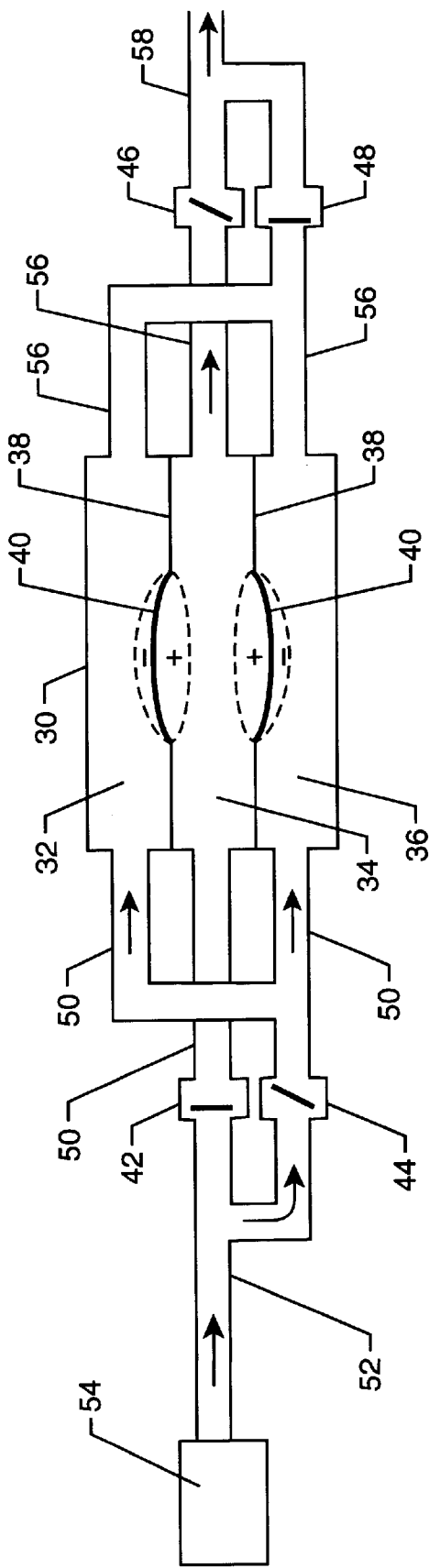
FIG. 1 is a diagram of an embodiment of the pump having three pumping chambers.

A first embodiment of the invention is illustrated in FIG. 1, which is a diagram of a three-chamber pump. The pump housing 30 encloses three pumping chambers 32, 34, and 36. As many pumping chambers as desired and as few as one may be used. Each pumping chamber has at least one wall 38 comprising a dome shaped internally prestressed ferroelectric actuator 40 having a curvature and a dome height that varies with an electric voltage applied between an inside and outside surface of the actuator. Examples of such actuators are shown in U.S. Pat. No. 5,471,721, hereby incorporated by reference, and commonly available from Aura Ceramics, and in "Thin Layer Composite Unimorph Ferroelectric Driver and Sensor", U.S. Pat. No. 5,632,841, also hereby incorporated by reference. Application of an electric voltage to the ferroelectric actuator causes an electric field between the faces of the actuator, and in response the shape of the actuator changes. The actuator will either flatten or heighten depending on the polarity of the applied electric field. This type of ferroelectric actuator inherently exhibits a favorable balance between the range of mechanical motion and the range of force it outputs. The choice of ferroelectric actuator size, along with the applied voltage and frequency, determines the specific amount of motion and force produced. This ferroelectric actuator can have strains up to several hundred percent and can sustain loads of at least ten pounds. The work capacity of the pump can be increased by using multiple ferroelectric actuators mounted on a common manifold. Twice as large excursions can be obtained from a pair of actuators stacked rim against rim in clamshell fashion. Several such clamshell assemblies can be cascaded if still larger excursions are needed. Such arrangements are described in U.S. Pat. No. 5,471,721 and U.S. Pat. No. 5,632,841.

Figure 3:
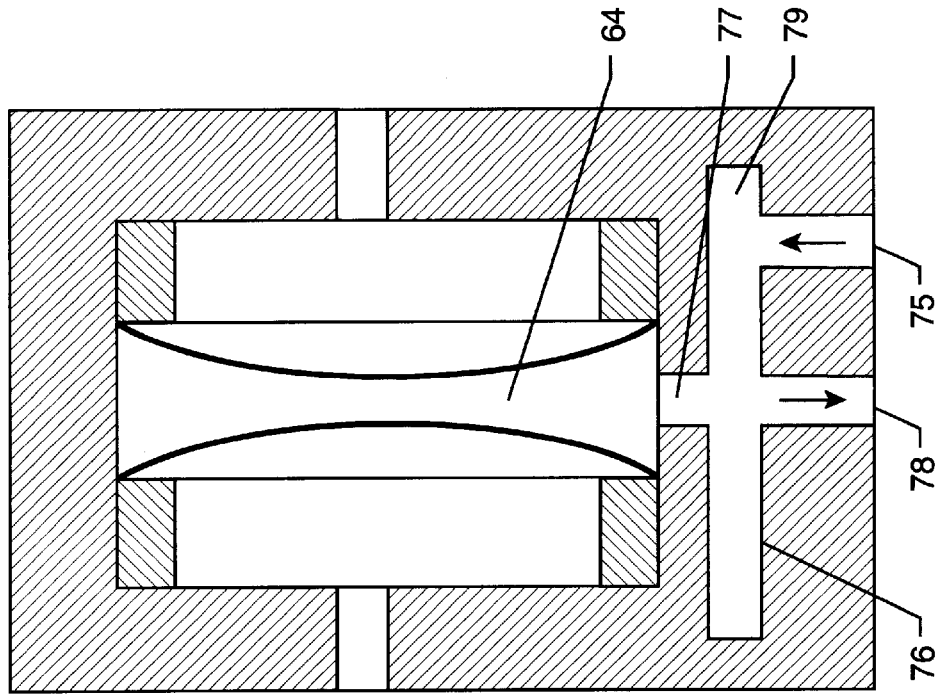
FIG. 3 is a single chamber pump with a fluidic valve.
Figure 2:
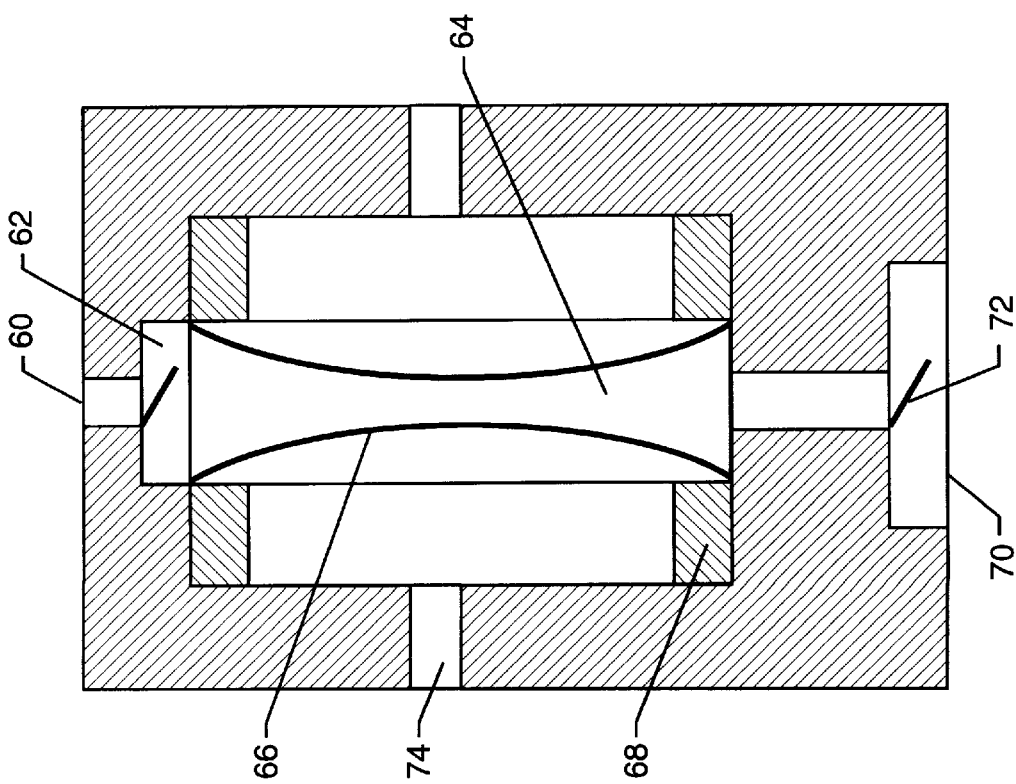
FIG. 2 is a single chamber pump with valves.

The actuator drive voltage can be any waveform, although sinusoidal is preferable. During positive half-cycle of sinusoidal drive voltage, the actuators move toward each other. Valves 44 and 46 open and valves 42 and 48 close. Liquid flows into sections 32 and 36 and exits section 34. During negative half-cycle of sinusoidal drive voltage, the actuators move away from each other. Valves 44 and 46 now close and valves 42 and 48 open. Liquid flows into section 34 and exits sections 32 and 36. The pumped medium flows from the pumped medium source 54 to each chamber by means of inlet flow lines 50. One pumped medium supply inlet 52 is connected to the pumped medium source 54. The chamber supply inlets 50 located at the entrance to each chamber are interfaced to the supply inlet 52. The pumped medium exits the chambers by means of outlet flow lines 56. One-way flow valves 42 and 44 positioned between the supply inlet 52 and chamber inlets 50 allow the pumped medium to enter each pumping chamber in response to the actuators and also prevent back-flow of the pumped medium. The outlet is configured similarly to the inlet with chamber discharge outlets 56, a medium discharge outlet 58 and one-way flow valves 46 and 48. In the configuration depicted in FIG. 1, the volumes of chambers 32 and 36 are shown in their decreased state, thus forcing the pumped medium out. Valve 44 prevents back-flow of the medium when the volume of chambers 32 and 36 are being reduced and valve 48 allows the flow from the decreased chamber volume to exit. The volume of chamber 34 is shown as being increased, thus bringing flow into the chamber. Valve 42 opens to allow the pumped medium to enter chamber 34 and valve 46 closes to prevent backflow of the pumped medium. There are numerous possible configurations of pumping chambers and flow valve and pipe arrangements. FIG. 1 is meant only to be one example of the pump configuration. A single chamber can be used or multiple chambers greater than three can be used. Either conventional valvues or ferroetectric valves, such as that described in U.S. Pat. No. 5,961,096, which is hereby incorporated by reference, can be used. Also, the valves can be of any suitable configuration; e.g., the inlet and outlet valves can be located on opposite ends of the chambers or at a single end of the chambers. A simple single chamber pump is shown in FIG. 2, the operation of which generally follows the above three-chamber discussion. The pumped medium enters at inlet 60 through valve 62 and exits at outlet 70 through valve 72. Pumping chamber 64 is formed by two ferroelectric actuators 66. Seals 68 and valves 62 and 72 can be of any suitable configuration. An orifice 74 can be provided to prevent back pressure on the moving actuators 66. FIG. 3 also shows a single chamber embodiment; however, this embodiment uses a fluidic valve configuration 76, thereby avoiding any moving parts. The diameter of port 77 is less than the diameter of valve outlet 78. Volume 79 is cylindrically shaped. The pumped medium enters through inlet 75 and then flows into pump chamber 64 through port 77. The flow of the pumped medium from port 77 out of outlet 78 has a velocity vector due to entrainment of the flow. Such a velocity vector and entrainment of flow is not present at inlet 75.

Figure 4:
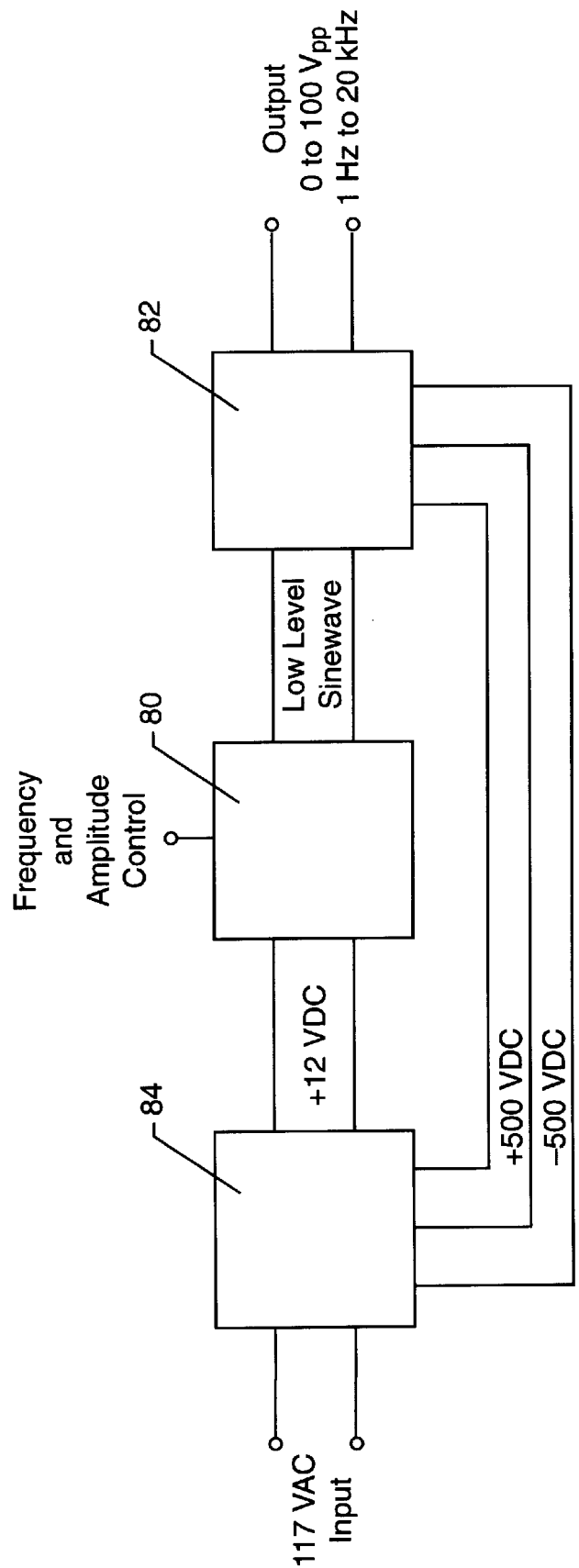
FIG. 4 is a diagram representing suitable electronic circuitry for providing a sinusoidally varying voltage waveform.

The displacement of each actuator occurs when voltage is supplied to the actuator. By controlling the amplitude and frequency of this varying voltage, pumping action and thereby pump flow rates are controlled. Flow rates can be adjusted over the range of a few per cent of maximum flow to full flow with great precision. FIG. 4 is a block diagram of suitable electronic logic for providing a sinusoidally varying voltage waveform. In consists of a waveform generator 80 which generates the sinusoidal wave shape for pump operation, a voltage amplifier 82 which raises the voltage and current to levels required by the actuators and a dc power supply 84 which provides dc voltages for the waveform generator 80 and voltage amplifier 82. This circuit is capable of providing an output sine wave of up to 1000 volts peak-to-peak in amplitude at 1 Hz to 20 kHz frequency range and several hundred milliamperes of current. For the waveform generator 80, a dedicated function generator integrated circuit chip, such as XR2206, with the addition of a few resistors, capacitors and potentiometers will produce the desired sinusoidal wave shape which is variable in amplitude from 0 to 6 volts peak-to-peak and from 1 Hz to 20 kHz in frequency. This low level sine wave signal is connected to the input of the fixed gain voltage amplifier 82 which can provide up to times 200 increase in voltage amplitude. One practical amplifier design uses two high voltage operational amplifiers connected in a push-pull configuration which will provide twice the output of a single opamp. A wide selection of high voltage opamps is available to tailor the circuit for high voltage output capability at moderate levels of output current or to provide moderate levels of output voltage at higher output current capability. The actual requirements of the particular actuator will determine the selection of the high voltage opamp. A suitable configuration of a push-pull circuit using two Apex PA89 opamps, manufactured by Apex Microtechnology Corporation, with a few external components was easily configured to provide the required voltage and current to drive the actuators. The dc power supply provides dc voltages to the waveform generator 80 and amplifier circuit 82. The modular power supply provides 12 Vdc to the waveform generator and amplifier circuit. Two dc-to-dc converters step the 12 Vdc to up to +500 and −500 Vdc which is required by the high voltage opamps in the amplifier circuit.

Figure 5:
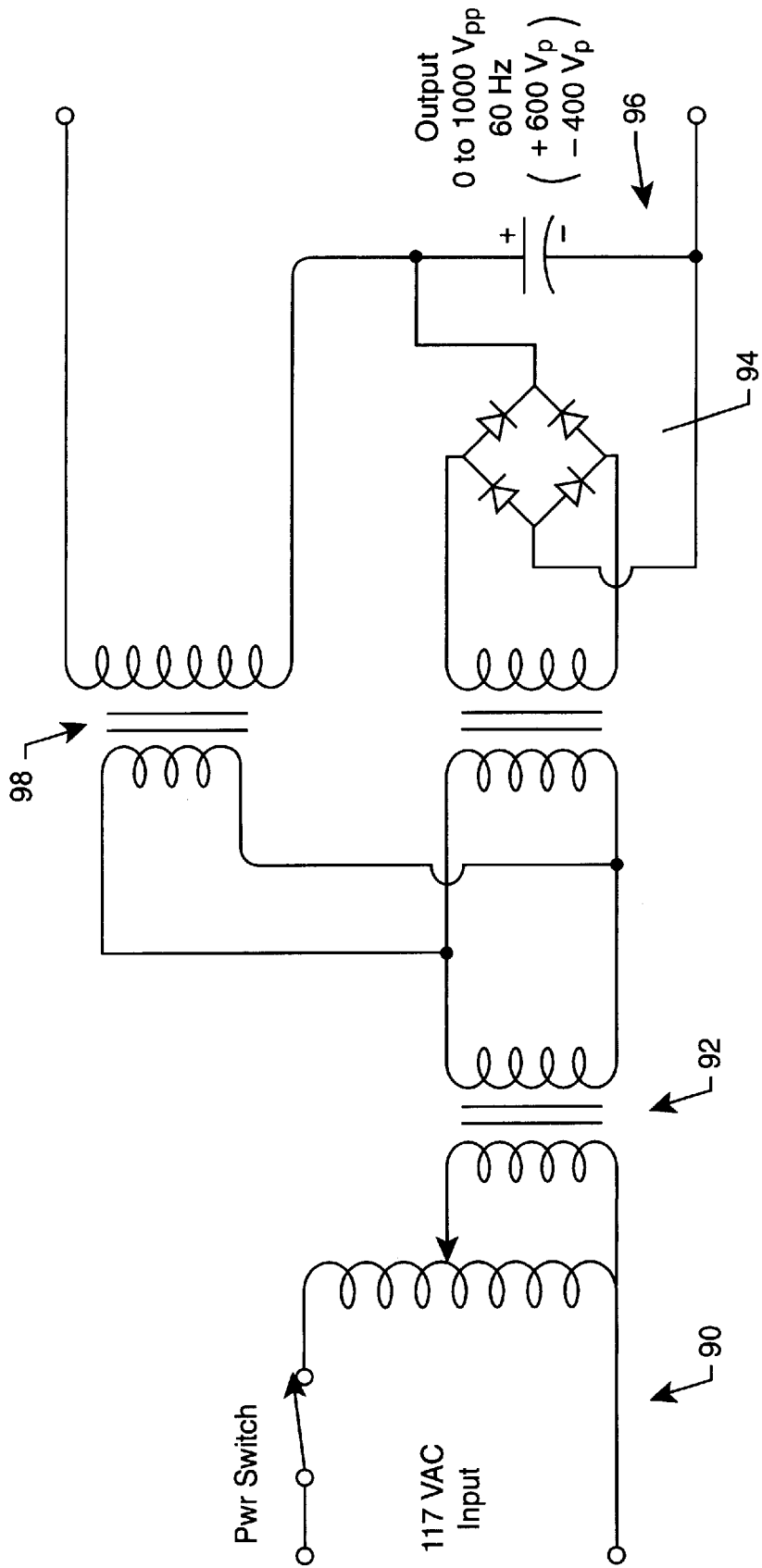
FIG. 5 is diagram representing suitable electronic circuitry for providing a sinusoidally varying voltage at a fixed frequency.

Another suitable electronic circuit for providing a sinusoidally varying voltage at a fixed 60 Hz frequency is shown in FIG. 5. It consists of a variable transformer 90 whose input is connected to any standard 117 vac wall outlet. The output of the variable transformer 90 is connected to a 1:1 turns ratio isolation transformer 92 for operator safety. The output of the transformer 92 connects to the remaining two sections of the power supply. One section is a full wave bridge rectifier 94 containing a filter capacitor 96 for providing a positive dc bias at the electronic circuit output. The other section is a voltage step-up transformer 98 for providing the higher voltage levels required by the actuators. The output of the step-up transformer 98 is connected in series with the positive dc bias voltage. Through proper selection of the voltage step-up transformer 98 and by adjustment of the variable transformer 90 control, the output voltage of this circuit can provide from 0 to 1000 volts peak-to-peak amplitude. Due to the positive dc bias, the typical maximum output voltage is +600 volts peak and −400 volts peak. It is an inherent property of the actuators to respond to higher levels of positive voltage than negative voltage. Thus, for maximum displacement of the actuators to occur, the positive dc bias is utilized.

Figure 6:
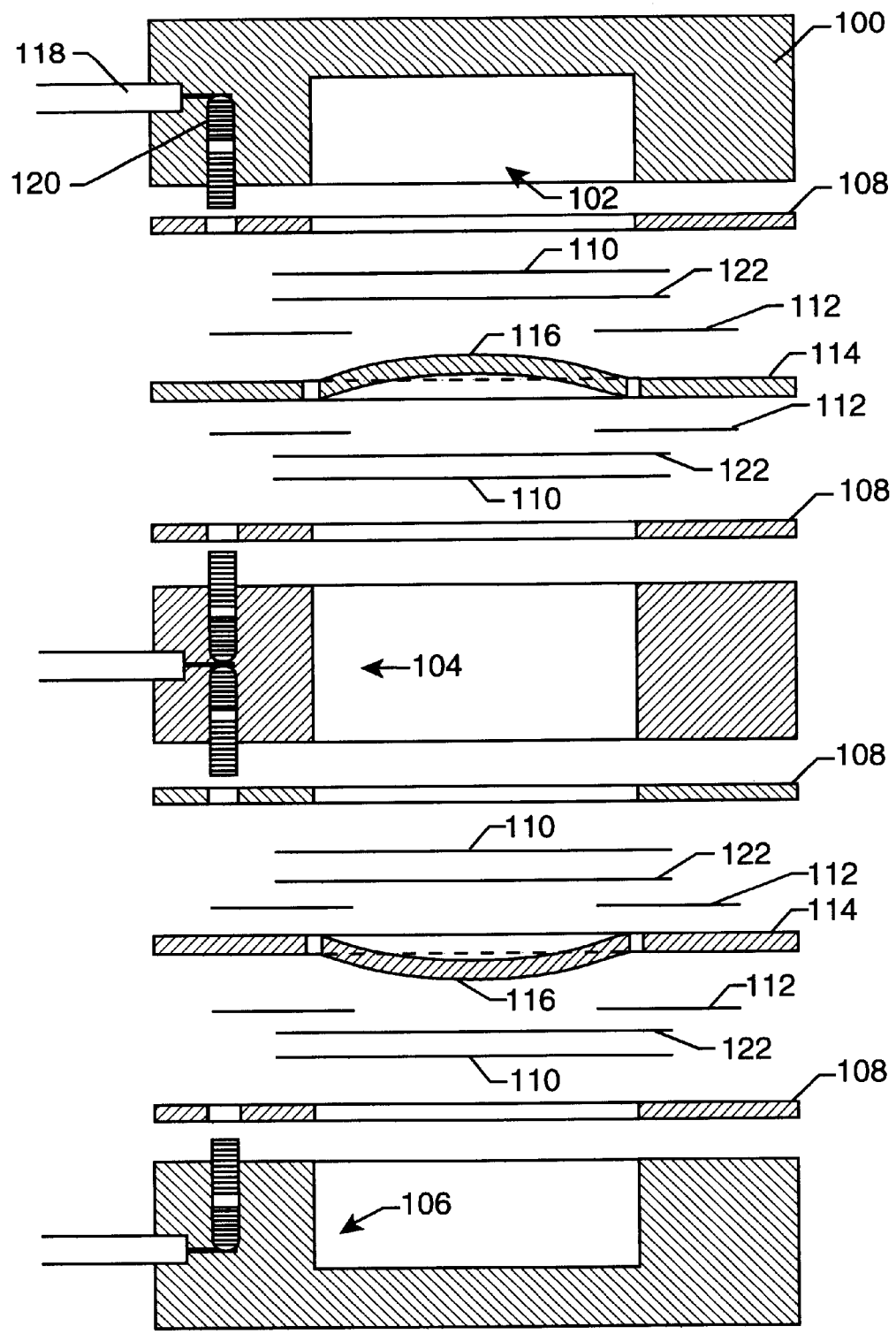
FIG. 6 is an exploded view of the ferroelectric actuator mounting.

The actuators are mounted such that the mounting configuration isolates each actuator from the pumped medium, supplies a path for voltage to be applied to each actuator, and provides for positive containment of each actuator while allowing displacement of the entirety of each actuator in response to an applied voltage. FIG. 6 is an exploded view of one embodiment of the housing and pump chambers. A nonconductive pump housing 100 encloses the three pumping chambers 102, 104, and 106. A wall assembly forms a partition between each chamber. Each wall is formed by two nonconductive sealing gaskets 108, two electrical insulators 110, two electrical contact rings 112, an actuator spacer 114, and an actuator 116. It is preferred that the spacer 114 has the same thickness as the actuator 116. The actuator 116 is positioned within the spacer 114 such that the circumference of the actuator 116 is contiguous with the inner circumference of the spacer 114. An electrical contact ring 112 is positioned contiguous to each side of the spacers 112 and provides voltage contact to the actuator 116. An electrical insulator 110 is positioned contiguous to the outside surface of each contact ring 112 and concentric with the actuator 116. The insulator 110 should be compatible with the pumped medium and possess some elasticity; e.g. latex. A nonconductive fluid 122, such as a silicon fluid, is used between the insulator 110 and the actuator 116. The fluid should be chemically stable with the other materials and be of a suitable viscosity to hold the insulator 110 and actuator 116 together. This eliminates air pockets which increases efficiency and capability. A sealing gasket 108 having a hole concentric with the contact ring 112 hole is positioned contiguous to each insulator 110. The sealing gasket 108 is made from a nonconductive material such as rubber. The wall assembly is contained between sections of the housing by a fastening means such as set screws. The fastening force required is only the minimum force required to adequately maintain the assembly. No prestress is required.

The design is not limited to any certain number, thickness or size of actuators. Each particular application should be considered to design component parameters; e.g., amount of actuator displacement and actuator force capability.

Figure 7:
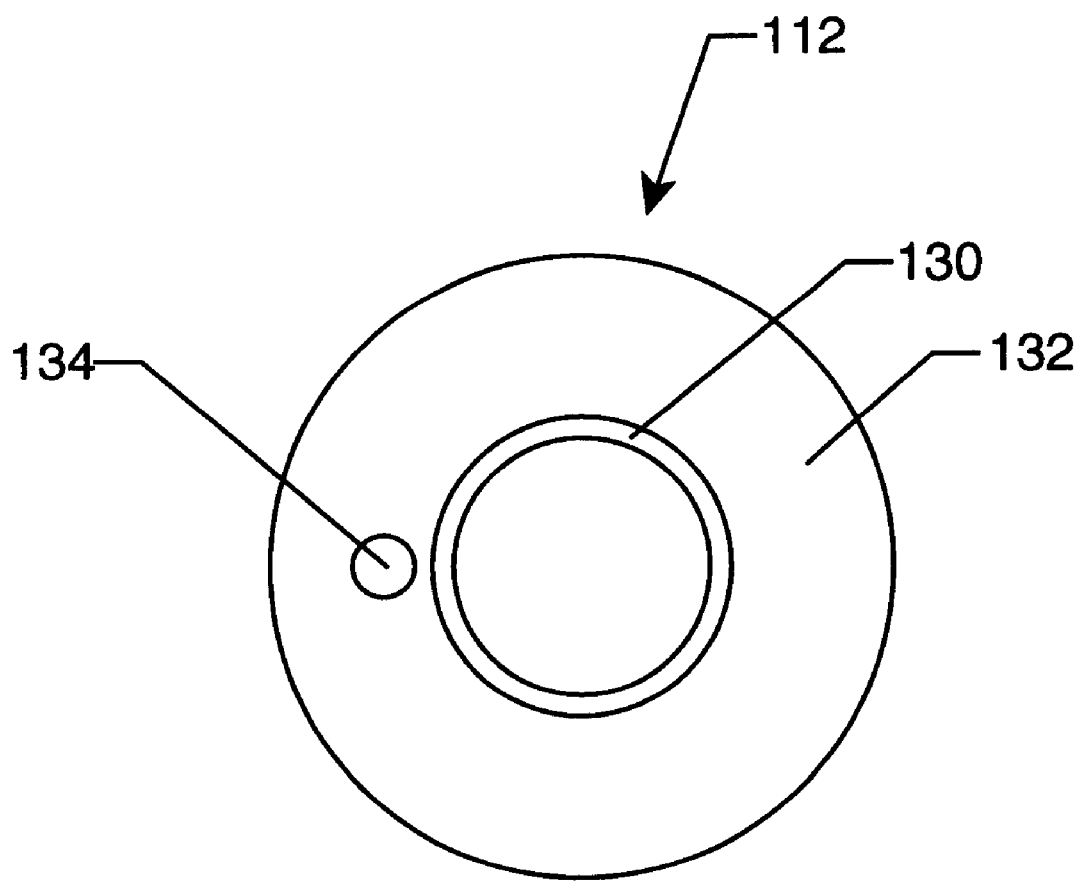
FIG. 7 is an electrical contact ring.

A voltage lead 118 is positioned in the housing 100 via a drilled hole in the housing 100. The lead 118 contacts a set screw spring 120 positioned in the housing 100. The set screw 120 contacts the electrical contact ring 112 to provide the applied voltage to the ring 112. The contact ring 112 overlaps a portion of both the spacer and the actuator. As shown in FIG. 7, the contact ring has a portion 130 overlapping the actuator which is an electrical conductor such as aluminum foil. The outer portion 132 of the ring that is in contact with the actuator is a nonconductive material which has a conductive portion 134 which contacts the set screw spring. Masking tape is one example of a suitable nonconductive material. Although circular actuators and associated circular shaped mounting components are preferred, other shapes can be utilized.

The positive and negative voltage levels applied to the actuator will vary with its thickness, with arc over resulting from too much voltage.

The efficiency and capacity of the pump can be improved by using valves capable of high frequency response. The fluid flow capability will be several times better if ferroelectric valves, such as described in "U.S. Pat. No. 5,961,096, " which is hereby incorporated by reference, are utilized.

In comparison to conventional displacement pumps, the present pump has improved reliability and lower cost due to the lack of mechanical moving parts. The present pump also has improved efficiency over conventional pumps. The heat loss associated with copper windings as well as magnetic losses from eddy currents suffered by existing devices is completely absent. There is also improved reliability, lower cost, less complexity, and smaller size with respect to existing piezoelectric pumps due the lack of bonding/assembly of multiple piezoelectric disks. The same force and displacement can be obtained as is presently possible only with an assembly of piezoelectric disks. In addition, the mounting configuration allows displacement of the entirety of each actuator in response the applied voltage.

Obviously, numerous additional modifications and variations of the present invention are possible in light of above teachings. It is therefore to be understood that within the scope of the appended claims, the invention may be practiced otherwise than is specifically described herein.

What is claimed is:

1. A ferroelectric pump, comprising:

a pump housing;

one or more variable volume pumping chambers internal to said housing, wherein each said chamber has at least one wall comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator;

an inlet means through which a pumped medium flows into each said pumping chamber in response to said actuator displacement;

an outlet means through which the pumped medium exits each said pumping chamber in response to said actuator displacement;

mounting means for mounting each said actuator, wherein said mounting means mounts each said actuator within each said corresponding wall, isolates each said actuator from the pumped medium, supplies a path for said voltage to be applied to each said actuator, and provides for positive containment of each said actuator within each said corresponding wall while allowing displacement of the entirety of each said actuator in response to said voltage; and electrical voltage means for supplying voltage to said actuators.

2. The device of claim 1 wherein said inlet means comprises:

at least one pumped medium supply inlet connected to a pumped medium source;

a chamber supply inlet at each said chamber; and one-way valving means interposed between said pumped medium supply inlet and each said chamber supply inlet, whereby said pumped medium enters each said pumping chamber in response to said displacement of each said actuator and whereby back-flow of the pumped medium is prevented.

3. The device of claim 1 wherein said outlet means comprises:

a chamber discharge outlet at each said chamber;

at least one pumped medium discharge outlet; and one-way valving means interposed between each said chamber discharge outlet and said pumped medium discharge outlet, whereby said pumped medium exits each said pumping chamber in response to said displacement of each said actuator and whereby back-flow of the pumped medium is prevented.

4. The device of claim 1, wherein said voltage means comprises:

a waveform generator which generates a wave shape for said pump operation;

a voltage amplifier which raises said waveform generator voltage and current to levels required by said actuators; and a dc power supply which provides dc voltages to said waveform generator and said voltage amplifier.

5. The device of claim 1, wherein said voltage means comprises:

a variable transformer;

an isolation transformer connected to said variable transformer;

a full wave bridge rectifier connected to said isolation transformer; and a step-up transformer connected to said isolation transformer;

wherein said full wave bridge rectifier and said step-up transformer are connected in series.

6. The device of claim 1, wherein said pumping medium is a liquid.

7. The device of claim 1, wherein said pumping medium is a gas.

8. The device of claim 2, wherein said valving means is a ferroelectric control valve comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator.

9. The device of claim 3, wherein said valving means is a ferroelectric control valve comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator.

10. A ferroelectric pump, comprising:
a pump housing;
one or more variable volume pumping chambers internal to said housing, wherein each said chamber has at least one wall comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator;
an inlet means through which a pumped medium flows into each said pumping chamber in response to said actuator displacement;
an outlet means through which the pumped medium exits each said pumping chamber in response to said actuator displacement;
mounting means for mounting each said actuator, wherein said mounting means mounts each said actuator within each said corresponding wall, isolates each said actuator from the pumped medium, supplies a path for said voltage to be applied to each said actuator, and provides for positive containment of each said actuator within each said corresponding wall while allowing displacement of the entirety of each said actuator in response to said voltage;
electrical voltage means for supplying voltage to said actuators; and further wherein said mounting means comprises:
a spacer having a first planar surface and a second planar surface and having a center opening within which is positioned said actuator such that the outer boundary of said actuator is contiguous with said opening boundary;
first and second electrical contact layers, each contact layer having a center opening, first said contact layer positioned contiguous to a portion of said first spacer planar surface, second said contact layer positioned contiguous to a portion of said second spacer planar surface, which provide voltage contact to said actuator;
first and second electrical insulators, each said insulator having a first planar surface and a second planar surface, said first insulator planar surface of said first insulator centered over and positioned contiguous to a portion of the outside surface of first said contact layer and centered over said actuator, said first insulator planar surface of said second insulator centered over and positioned contiguous to a portion of the outside surface of second said contact layer and centered over said actuator;
a nonconductive fluid between said actuator and each said insulators of suitable viscosity to hold said insulators and said actuator together;
two nonconductive sealing gaskets, each gasket having a center opening centered over said corresponding contact layer opening and positioned contiguous to each said corresponding second planar surface of said insulators; and
fastening means to fix said spacer, said contact layers, said insulators, and said gaskets to said housing.

11. A ferroelectric pump, comprising:
a pump housing;
one or more variable volume pumping chambers internal to said housing, wherein each said chamber has at least one wall comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator;
a fluidic valve means by which the pumped medium flows into and out of each said pumping chamber in response to said actuator displacement;
a mounting means for mounting each said actuator, wherein said mounting means mounts each said actuator within each said corresponding wall, isolates each said actuator from the pumped medium, supplies a path for said voltage to be applied to each said actuator, and provides for positive containment of each said actuator within each said corresponding wall while allowing displacement of the entirety of each said actuator in response to said voltage; and
electrical voltage means for supplying voltage to said actuators.

12. A method of mounting a ferroelectric actuator, comprising the steps:
positioning said actuator within a spacer having a first planar surface and a second planar surface and having a center opening such that the outer boundary of said actuator is contiguous with said opening boundary;
positioning first and second electrical contact layers, each contact layer having a center opening, such that first said contact layer is positioned contiguous to a portion of said first spacer planar surface, second said contact layer is positioned contiguous to a portion of said second spacer planar surface, to provide voltage contact to said actuator;
positioning first and second electrical insulators, each said insulator having a first planar surface and a second planar surface, such that said first planar surface of said first insulator is centered over and positioned contiguous to a portion of the outside surface of first said contact layer and is centered over said actuator, and said first planar surface of said second insulator is centered over and positioned contiguous to a portion of the outside surface of second said contact layer and centered over said actuator;
placing a nonconductive fluid between said actuator and each said insulators of suitable viscosity to hold said insulators and said actuator together;
positioning two nonconductive sealing gaskets, each said gasket having a center opening centered over said corresponding contact layer opening and positioned contiguous to each said corresponding second planar surface of said insulators; and
providing fastening means to fix said spacer, said contact layers, said insulators, and said gaskets to said housing.

13. A mount for a ferroelectric actuator, comprising:
a spacer having a first planar surface and a second planar surface and having a center opening within which is positioned said actuator such that the outer boundary of said actuator is contiguous with said opening boundary;

first and second electrical contact layers, each contact layer having a center opening, first said contact layer positioned contiguous to a portion of said first spacer planar surface, second said contact layer positioned contiguous to a portion of said second spacer planar surface, which provide voltage contact to said actuator;

first and second electrical insulators, each said insulator having a first planar surface and a second planar surface, said first planar surface of said first insulator centered over and positioned contiguous to a portion of the outside surface of first said contact layer and centered over said actuator, said first planar surface of said second insulator centered over and positioned contiguous to a portion of the outside surface of second said contact layer and centered over said actuator;

a nonconductive fluid between said actuator and each said insulators of suitable viscosity to hold said insulators and said actuator together;

two nonconductive sealing gaskets, each gasket having a center opening centered over said corresponding contact layer opening and positioned contiguous to each said corresponding second planar surface of said insulators; and fastening means to fix said spacer, said contact layers, said insulators, and said gaskets to said housing.

14. A ferroelectric pump, comprising:

a pump housing;

one or more variable volume pumping chambers internal to said housing, wherein each said chamber has at least one wall comprising a dome shaped internally prestressed ferroelectric actuator having a curvature, said dome shaped actuator having a rim and an apex, and a dome height measured from a plane through said rim to said apex that varies with an electric voltage applied between an inside and an outside surface of said dome shaped actuator;

an inlet means through which a pumped medium flows into each said pumping chamber in response to said actuator displacement;

an outlet means through which the pumped medium exits each said pumping chamber in response to said actuator displacement;

mounting means for mounting each said actuator, wherein said mounting means mounts each said actuator within each said corresponding wall, isolates each said actuator from the pumped medium, supplies a path for said voltage to be applied to each said actuator, and provides for positive containment of each said actuator within each said corresponding wall while allowing displacement of the entirety of each said actuator in response to said voltage;

electrical voltage means for supplying voltage to said actuators: and further wherein said voltage means comprises:

a voltage lead positioned in said housing; and a set screw spring contacted by said voltage lead, said spring contacting said mounting means.

* * * * *